Patented Jan. 13, 1948

2,434,409

UNITED STATES PATENT OFFICE 2,434,409

PROCESS FOR PURIFYING A HYDROCARBON MIXTURE CONTAINING SMALL AMOUNTS OF ORGANIC FLUORINE COMPOUNDS

Vladimir N. Ipatieff and Carl B. Linn, Riverside, Ill., assignors to Universal Oil Products Company, Chicago, Ill., a corporation of Delaware No Drawing. Application May 31, 1943, Serial No. 489,152

5 Claims. (Cl. 196—40)

This invention relates to a process for treating hydrocarbon mixtures to remove fluorine therefrom. More specifically it relates to the treatment of synthetic hydrocarbons produced with active fluoride catalysts to remove small amounts of organic fluorine compounds which may be present in the hydrocarbons. The invention is particularly adapted to the treatment of hydrocarbons produced by the alkylation of an isoparaffin with an olefin using active fluoride catalysts, including hydrogen fluoride or hydrofluoric acid and mixtures comprising essentially hydrogen fluoride and boron fluoride.

The alkylation of branched chain paraffins, such as isobutane and isopentane, with olefins to produce liquid hydrocarbons, which are of great value as gasoline motor fuels because of their high antiknock properties, has now assumed commercial importance. Active fluoride catalysts as heretofore mentioned are utilized in effecting the alkylation reaction, but it has been found that the resultant alkylation product frequently contains minor quantities of fluorine in combination with the hydrocarbons, possibly due to the interaction of hydrogen fluoride with the olefinic constituents of the reaction mixture under the action of the catalyst.

Although the fluorine content of the alkylate is rarely very high, its presence is undesirable. It has been found that the presence of fluorine in an alkylate is definitely objectionable because of its corrosive character, its tendency to readily react with various substances with which it comes into contact and thereby form undesirable products which may result in plugging of the pipe lines, and to its possible detrimental effect on the antiknock properties of the alkylate.

In addition to the treatment of normally liquid hydrocarbon mixtures containing combined fluorine, the present invention is also applicable to the treatment of normally gaseous fractions containing combined fluorine. Thus the invention is particularly applicable to the treatment of a hydrocarbon fraction containing hydrocarbons having four carbon atoms to the molecule and containing combined fluorine compounds as an impurity therein.

In a broad aspect, the present invention relates to treating a hydrocarbon mixture containing a combined fluorine compound to remove the fluorine, which comprises contacting said mixture with sulfuric acid.

In one specific embodiment the present invention comprises a process for purifying an alkylation product formed in the presence of an active fluoride catalyst and containing a relatively small amount of an organically combined fluorine compound as an impurity, which comprises contacting said alkylation product with sulphuric acid of at least 90% concentration under dehydrofluorinating conditions.

According to the present invention, the hydrocarbon mixture is contacted with sulphuric acid under dehydrofluorinating conditions in order to remove the fluorine from the hydrocarbon. The sulphuric acid to be employed will generally be of at least 90% concentration and preferably the concentration of the sulphuric acid is between about 93% to about 98%.

The dehydrofluorinating treatment may be effected at substantially atmospheric temperature and, in general, the temperature should not be substantially above 100° F. The volume of sulphuric acid employed will vary with the concentration of sulphuric acid as well as with the concentration of organically combined fluorine in the hydrocarbon mixture. Any suitable pressure may be employed, which may range from substantially atmospheric to 200 pounds per square inch, or more.

The treatment of the hydrocarbon mixture with sulphuric acid may be effected in any suitable manner, such as washing and agitating the hydrocarbon mixture with sulphuric acid, either in a concurrent flow but preferably in a countercurrent flow operation, or in a batch treatment.

In certain cases, but not necessarily with the equivalent results, mixtures of sulphuric acid and other compounds such as nitric acid, acid salts and/or sulfonic acids may be employed.

The following examples are introduced for the purpose of further illustrating the novelty and utility of the present invention but not with the intention of unduly limiting the same.

*Example I*

15 cc. of a gasoline formed by alkylating isobutane with butylene in the presence of hydrogen fluoride was shaken several times with an equal volume of 96% sulfuric acid. The gasoline was separated from the sulphuric acid, washed with water and dried. The gasoline before the sulphuric treatment contained 0.3% of fluorine, but after the sulphuric treatment it contained less than 0.05% of fluorine.

*Example II*

Isobutane may be alkylated with normal butylene in the presence of hydrogen fluoride to produce an alkylate which may contain 0.06% of fluorine. The alkylate may then be treated with 1 volume of sulphuric acid of 95% concentration per 4 volumes of alkylate at atmospheric temperature under atmospheric pressure to reduce the fluorine content of the alkylate to 0.001%.

We claim as our invention:

1. A process for purifying a hydrocarbon mixture containing as an impurity a relatively small amount of an organically combined fluorine compound and produced by the catalytic alkylation of hydrocarbons in the presence of an active fluoride catalyst, which comprises treating said mixture with sulphuric acid of at least 90% concentration.

2. A process for purifying a hydrocarbon mixture containing as an impurity a relatively small amount of an organically combined fluorine compound and produced by the catalytic alkylation of isoparaffin by an olefin in the presence of hydrogen fluoride, which comprises contacting said mixture with sulfuric acid of at least 90% concentration.

3. A process for purifying a hydrocarbon mixture containing as an impurity a relatively small amount of an organically combined fluorine compound and produced by the catalytic alkylation of isoparaffin by an olefin in the presence of hydrogen fluoride which comprises contacting said mixture with sulfuric acid of a concentration of from about 95% to about 98% at substantially atmospheric temperature.

4. A method for purifying a hydrocarbon material containing as an impurity a relatively small amount of an organic fluorine compound, which comprises treating the hydrocarbon material with sulfuric acid of at least 90% concentration to remove the organic fluorine compound therefrom.

5. A method for purifying a hydrocarbon material containing as an impurity a relatively small amount of an organic fluorine compound, which comprises treating the hydrocarbon material with sulfuric acid of 96% concentration to remove the organic fluorine compound therefrom.

VLADIMIR N. IPATIEFF.
CARL B. LINN.

REFERENCES CITED

The following references are of record in the file of this patent:

UNITED STATES PATENTS

| Number | Name | Date |
|---|---|---|
| 2,143,493 | Stanley | Jan. 10, 1939 |
| 2,320,629 | Matuszak | June 1, 1943 |
| 2,310,327 | Sweeney | Feb. 9, 1943 |
| 2,292,933 | Hofmann | May 23, 1929 |
| 2,267,730 | Grossee et al. | Dec. 30, 1941 |
| 2,076,581 | Kharasch | Apr. 13, 1937 |

FOREIGN PATENTS

| Number | Country | Date |
|---|---|---|
| 540,449 | Great Britain | Oct. 17, 1941 |